United States Patent

[11] 3,530,877

[72] Inventor Nelson R. Henry
583 Willivee Drive, Decatur, Georgia 30333
[21] Appl. No. 642,477
[22] Filed May 31, 1967
[45] Patented Sept. 29, 1970

[54] AUTOMATIC VALVE ASSEMBLY
8 Claims, 6 Drawing Figs.
[52] U.S. Cl. .................................................. 137/408, 137/442, 251/234
[51] Int. Cl. .................................................. E03 1/02, F16k 31/44
[50] Field of Search .......................................... 137/403, 408, 442, 444, 445; 251/231, 234; 119/81; 126/113

[56] References Cited
UNITED STATES PATENTS

| | | | |
|---|---|---|---|
| 1,753,122 | 4/1930 | Kielsmeier | 137/408 |
| 2,512,839 | 6/1950 | Pruitt | 119/81X |
| 2,973,775 | 3/1961 | Witham | 137/408 |
| 3,090,399 | 5/1963 | Godshalk | 137/408X |
| 3,112,762 | 12/1963 | Reitman | 137/408 |

FOREIGN PATENTS

| 487,033 | 10/1952 | Canada | 137/408 |
|---|---|---|---|

Primary Examiner—Alan Cohan
Assistant Examiner—David R. Matthews
Attorney—Newton, Hopkins and Ormsby ABSTRACT: An automatic double acting watering trough valve having few moving parts which can be assembled and disassembled without the use of tools, without removing it from the valve stand or shutting off the water.

Patented Sept. 29, 1970
3,530,877
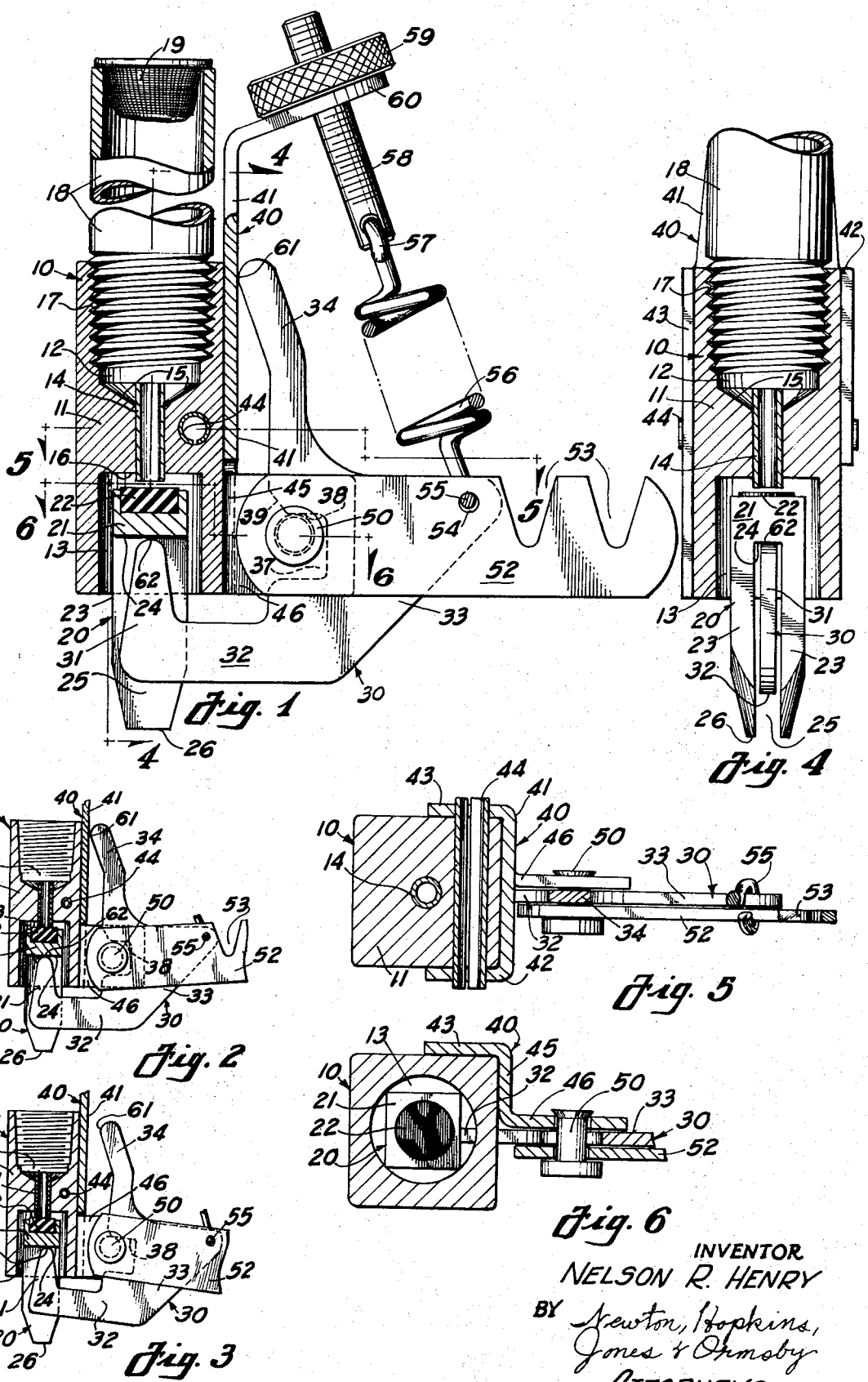
INVENTOR
NELSON R. HENRY
BY Newton, Hopkins, Jones & Ormsby
ATTORNEYS

AUTOMATIC VALVE ASSEMBLY

This invention relates to an automatic valve assembly and is more particularly concerned with an automatic watering trough valve for use primarily in the raising of poultry.

In the past, automatic watering trough valves have been quite extensively used in conjunction with watering troughs for maintaining a prescribed water level in the troughs. The modern automatic watering trough valve is usually a double acting valve, having a lever which, in its extreme positions, shuts off the valve and in its intermediate position opens or turns on the valve. By the provision of springs, the prior art valves are urged to their "off" positions so that the troughs may be removed for cleaning, leaving the valves automatically "off".

While being quite effective in operation, the prior art valves, nevertheless, are subject to various problems. For example in most prior art valves, the strainer is quite inaccessible and serves a double function of maintaining the cooperating parts in proper relationship, thereby rendering the prior art valves difficult to clean.

The prior art valves also have quite a number of moving parts, thereby making such valves expensive and complicated. Some valves also require special tools for their assembly and disassembly. Furthermore, many of the prior art valves are complicated by the fact that they have two valves and two valve seats with a stem connecting the two valves.

Briefly described, the present invention which tends to overcome the disadvantages described above, includes a housing having upper and lower chambers which are separated by a partition, through which protrudes a hollow tube. The bottom terminus of the tube forms a valve seat against which a resilient valve washer is adapted to be urged. The washer is carried in the upper end of a bifurcated axially movable valve, removably carried in the lower chamber. One arm, i.e., a valve actuating arm, of a flat L-shaped valve control member, is received in the slot of the valve for actuating the valve along an axial path from an upper closed position to a lower open position. The other arm, i.e., a guide arm, of the control member moves along the side surface of the housing. Outwardly of both arms, an intermediate portion of the control member is pivotally secured to the control lever. This pivotal connection is also outwardly of the control lever's pivotal connection to the housing. Therefore, a spring, one end of which forms the pivotal connection between the lever and member and the other end of which is connected to the housing, urges both the lever and the member to their uppermost positions, such that the guide arm rides along the housing and forces the valve support arm inwardly to close the valve. In the lowermost position of the lever, as when the trough is full of water, the control member rests against the pivot pin for the lever and is therefore tilted or pivoted with the lever about the pivot pin to urge the valve support arm upwardly (inwardly) to close the valve. Of course, in the intermediate position, the control member is lowered from its uppermost position and the valve is lowered to its open position.

Accordingly, it is an object of the present invention to provide an automatic valve assembly having few moving parts and which can be assembled and disassembled without the use or necessity of tools.

Another object of the present invention is to provide an automatic valve assembly in which there is no need for a strainer to retain parts in place.

Another object of the present invention is to provide an automatic valve assembly which may be disassembled and reassembled without removing it from the valve stand or shutting off the water.

Another object of the present invention is to provide an automatic double acting valve assembly having a single valve and a valve seat.

Another object of the present invention is to provide an automatic valve which is inexpensive to manufacture, durable in structure, and efficient in operation.

Other objects, features, and advantages of the present invention will become apparent from the following description, when considered in conjunction with the accompanying drawings wherein like characters of reference designate corresponding parts throughout the several views and wherein:

FIG. 1 is an enlarged side elevational view, partly broken away, showing an automatic double acting watering trough valve assembly constructed in accordance with the present invention, the control lever being in its intermediate position for permitting the valve to open;

FIG. 2 is a fragmentary vertical sectional view on a reduced scale of the valve portion of the assembly and showing the control lever thereof in its upper extreme position for closing the valve;

FIG. 3 is a view similar to FIG. 2 and showing the control lever in its lowermost position for closing the valve;

FIG. 4 is a vertical sectional view taken substantially along line 4-4 in FIG. 1;

FIG. 5 is a cross sectional view taken substantially along line 5-5 in FIG. 1; and FIG. 6 is a cross-sectional view taken substantially along line 6-6 in FIG. 1.

Referring now in detail to the embodiment chosen for the purpose of illustrating the present invention, it being understood that in its broader aspects the present invention is not limited to the exact details herein depicted, numeral 10 denotes the housing or casing of the valve proper of the assembly. The housing 10 is preferably a cube, elongated along its vertical axis and divided by a central transverse partition 11 into an upwardly opening, cylindrical, upper chamber 12, and a downwardly opening, cylindrical lower chamber 13. The lower chamber 13 functions as a discharge spout.

A hollow tube 14, passing vertically along the axis of housing 10 through partition 11 provides communication between the two chambers 12 and 13, the upper end of tube 14 terminating slightly above the central portion of the inwardly and downwardly tapering conical upper wall 15 of partition 11. In like manner, the tube 14 terminates slightly below the flat horizontal lower wall 16 of partition 11.

The upper end portion of housing 10 is provided with internal threads 17 in upper chamber 12, the threads 17 threadedly receiving the externally threaded end of a stand pipe 18. The other or upper end of stand pipe 18 receives therein a removable circular wire strainer 19 and is connected by a flexible hose (not shown) to a source of water under pressure.

According to the present invention, the valve 20, itself, is an elongated bifurcated member, square in cross section and frusto-conical at its bottom portion. Thus, is provided a valve 20 having a valve head 21 which carries a resilient disc-shaped valve washer 22 partially recessed centrally in the upper surface of head 21.

The bifurcation forms a pair of complimentary guide arms 23 depending from opposed sides of the valve head 21, the inner or adjacent surfaces of which are flat and define, with the bottom surface 24 of head 21, a straight downwardly open slot 25. The valve 20 is substantially longer than the lower chamber 13 and therefore protrudes below housing 10, regardless of whether or not the valve is open. The lower end portions of arms 23, below the housing 10, each taper inwardly to a flat bottom portion 26, the tapered portion of each arm 23 being produced by a conical segment of the frusto-conical bottom portion.

It will be remembered that the base of the lower chamber 13 is cylindrical and that the cross section of valve 20 is square. Hence, when the washer 22 is moved downwardly from the end of tube 14, water or other fluid, as the case may be, from tube 14, will flow outwardly of head 21 toward the wall of chamber 13 and then downwardly between the wall of chamber 13 and the sides of valve 20. Below the housing 10, the water tends to adhere to the sides of valve 20, the water being directed inwardly and being broken up by the inwardly tapered lower portion of valve 20. Indeed, I have found out that, using a valve 20 with no tapered lower end portion, the water tends to splatter when being discharged, but this does not occur, to any appreciable extent when the valve 20 is tapered as described above.

For moving the valve 20 from its open position, as shown in FIG. 1, to its closed position, as shown in FIGS. 2 and 3, the valve assembly is provided with a radially disposed control member, denoted generally by numeral 30. This control member 30 is a quite inexpensive, thin, flat, stamped metal plate defining an upstanding valve activator arm or control finger 31 which is received in slot 25 along the axis of housing 10. The upper end of actuator arm 31 is rounded and is adapted to engage and act against bottom surface 24 of the valve head 21 as indicated at numeral 62.

From the surface 24, the arm 31 projects downwardly, being integrally joined at its lower end with a sidewise extending actuator support bar 32. The length of arm 31 is such that, at all times, the bar 32 is spaced below the lower end of housing 10.

The central body 33 of the control member 30 carries and is connected integrally to bar 32. The body 33 projects upwardly and outwardly in a radial direction from housing 10. The body 33 terminates in an upstanding bearing arm 34 which curves inwardly at its upper extremity. Thus, arms 31 and 34 project generally in the same direction; however, arm 34 is offset from and above arm 31.

Mounted along the side of housing 10, inwardly of bearing arm 34, is a bracket 40 which has a flat, central rectangular bearing plate 41 against one side of housing 10 and a pair of opposed retaining arms 42 and 43 projecting from opposite edges of plate 41 along opposed sides of housing 10. A hollow retaining pin 44 passing through the central portion of housing 10, i.e., through partition 11, and arms 42 and 43, secure the bracket 40 in place.

Arm 43 is longer than arm 42, the arm 43 being co-extensive with the length of housing 10. A brace 45 extends from arm 43 inwardly along the surface of housing 10 below and coplanar with plate 41 and is then bent outwardly to provide an outwardly projecting fulcrum plate 46. The fulcrum plate 46 is parallel to and flat against one side of body 33 of a control member 30. A pivot pin 50 projects sidewise from fulcrum plate 46 through a notched out portion 37 of body 33. The notched out or recessed portion 37 opens inwardly and loosely, partially encompassing the pivot pin 50. The upper edge or ledge 38 defining the notched out portion 37 is adapted to ride on the upper periphery of pivot pin 50 when lever 52 is in its intermediate to lowermost position. The inclined edge portion 39 of notch 37 is for the purpose of providing clearance for the actuator arm 31 as the control member 30 is removed.

On the other side of control member 30, the pivot pin 50 pivotally carries by one end the control lever 52. The control lever 52 is a flat generally rectangular member parallel to and adjacent control member 30. Lever 52 projects outwardly well beyond the extremitites of control member 30, and is provided with spaced upwardly opening notches 53 which selectively receive one end of the watering trough (not shown).

Between the innermost notch 53 and the pivot pin 50, the lever 52 is provided with a hole 54 which is aligned with a similar hole in the outer extremity of body 33 of control member 30. One hook 55 of a coil spring 56 passes through both holes, such as hole 54.

The other hook 57 passes through an appropriate hook in one end of a tensioning shaft 58. Substantially the entire length of tensioning shaft 58 is externally threaded and receives a knurled nut 59.

An upwardly and outwardly projecting arm 60 mounted by its inner end to the upper end of plate 41, well above bearing arm 34, is provided with a hole through which shaft 58 passes. Nut 59 rides against the upper surface of arm 60, the arrangement being such that, as the nut 59 is rotated to take up shaft 58, hook 57 is urged upwardly, applying tension on spring 56 to yieldably urge lever 52 to its upper most position, as shown in FIG. 2.

It will be observed that the bearing arm 34 normally is in slidable engagement with plate 41 at a point denoted by numeral 61. Also, that finger 31 engages surface 24 at a point designated by numeral 62. Spring hook 55, which serves a double function of providing a pivotal connection between the central portion of lever 52 and the end portion of body 33, and provides a means of which one end lever 52 is urged upwardly also defines one corner of an imaginary triangle, the other two corners of which are defined by points 61 and 62. Within the central portion of this imaginary triangle is pivot pin 50.

OPERATION

From the foregoing description, the operation of the valve assembly should be apparent. A flexible hose (not shown), leading from a source of water under pressure, is connected to the upper end of the stand pipe 18. Also, one end of a substantially horizontally disposed trough (not shown) is hooked over the end of lever 52 so that a portion of the trough (not shown) is received in one of the notches 53. The other end of the trough (not shown) is pivotally mounted in the usual way.

Under normal circumstances, the tension of spring 56 is such that the weight of the empty trough is sufficient to depress the lever 52 slightly as to lower slightly the hook 55 which, in turn, lowers control member 30, the lever 52 pivoting about pivot pin 50 and also pivoting slightly with respect to control member 50, about hook 55. This lowering (without pivoting of control member 30) is accomplished since the weight of control member 30 tends to urge it in counterclockwise direction about hook 55 so that point 61 rides along plate 41. Notched portion 37, as lever 52 is moved from the uppermost position of lever 52, as seen in FIG. 2, to its intermediate position of lever 52, as seen in FIG. 1, loosely encompasses pivot pin 50. Therefore, arm 34 simply moves in a linear path downwardly, with point 61 thereof riding along plate 41. This action of the lowering of control member 30 in a linear path causes point 62 on control finger 31 to move downwardly also in a linear path in lower chamber 13.

Since the valve 20 is disposed within chamber 13 for movement in a linear path along the axis of housing 10 toward and away from the valve seat formed by the lower end of tube 14 and seats with pressure and since the valve 20 is also relatively heavy, the valve 20 is urged downwardly as contact point 62 on finger 31 moves downwardly to permit water in the upper chamber 12 to pass through tube 14 and then outwardly and around valve 20, passing downwardly between the flat walls of valve 20 and the curvilinear walls defining lower chamber 13.

As the water approaches the bottom 26 of valve 20, it is directed inwardly toward the axis of valve 20 because of the inverted frusto-conical bottom portion of valve 20. Thus, the tendency of the water to splatter is reduced.

As the trough begins to fill, the weight of the trough and the water therein become progressively greater, until it urges the lever 52 to its lowermost position as shown in FIG. 3.

It will be observed in FIG. 1 that when lever 52 has been moved to its intermediate position, the ledge 38 which defines the upper extremity of notch 38 is resting upon the upper periphery of pin 50. Hence, any further movement in a clockwise direction of lever 52 and hook 55 will not cause additional lowering of control member 30 but, instead, a rotation of control lever 30 about pivot pin 50 in a clockwise direction and in unison with lever 52. The clockwise pivoting of control member 30 raises point 62 on finger 31, carrying valve 20 upwardly toward its seated position. Also, the pivoting of control member 30 moves arm 34 outwardly of plate 41. Thus, there is a visual indication of the "closed" condition of the valve as seen in FIG. 3.

As lever 52 approaches its extreme position, the washer 22 of valve 20 is again seated on the end of tube 14, terminating the flow of liquid through tube 14. It is now seen that when the lever 52 is moved from its uppermost position, as seen in FIG. 3, the control member 30 is first moved downwardly in an essentially linear path of travel parallel to the axis of housing 10 to open the valve 20 to its fully open position as seen in FIG. 2. Upon continued downward movement of lever 52, the control member 30 reaches the lower extreme or extent of its linear travel as ledge 38 engages pin 50 and member 30 is then pivoted about the transverse axis of pivot pin 50, the axis of pivot pin 50 being offset from and approximately perpendicular to the axis of housing 10. The pivotal movement of control member 30 raises finger 31 to again close the valve.

If it is desired to wash the trough, the trough may be removed. When this occurs, spring 56 returns the valve assembly to the "off" or "closed" condition as depicted in FIG. 2.

The assembly and disassembly of the valve assembly is quite simple since the valve assembly has only three major moving parts, i.e., the valve 20, control member 30, and lever 52. To disassemble the valve assembly, knurled nut 59 is rotated sufficiently to lower spring 56 and thereby permit withdrawal of hook 55 from the holes, such as hole 54, in control member 30 and control lever 52. The control member 30 is now essentially free, since the distance from finger 31 to inclined ledge 39 is sufficient for the ledge to clear the pivot pin 50 as the finger 31 is removed from chamber 13. Upon removal of finger 31, the valve 20 simply drops out. The steps are reversed for reassembly.

Since valve 20 is not connected directly to control member 30 and protrudes from chamber 13 at all times, the water need not be cut off during the replacement of valve 20. Instead, the replacement can be accomplished quite quickly since the valve 20 may be held seated, manually, except during the period in which one valve 20 is substituted for another.

Since strainer 19 is in a position remote from the valve housing 10 and functions only as a strainer, it may be removed for cleaning without the necessity of disassembling the valve portion itself or removing the valve from its stand (not shown).

Since tube 14 stands above the tapered bottom 15 of upper chamber 12, small trash passing through the strainer 19 will collect on bottom 15 rather than pass through the tube 14.

Since the lever 52 need not be disturbed to disassemble the valve itself, the small and easily lost pivot pin 50 does not need to be disengaged from fulcrum 46. If the parts become worn, however, retaining pin 44 may be readily removed to permit replacement of bracket 40, pin 50 and lever 52 as a unit.

Since the fulcrum plate 46, control member 30 and lever 52 are each thin, flat members and are disposed in juxtaposition parallel to each other with the control member 30 sandwiched between plate 46 and control lever 52, these elements occupy little space and pivot pin 50 need be very short.

It will be obvious to those skilled in the art that many variations may be made in the embodiment chosen for the purpose of illustration, without departing from the scope thereof as defined by the appended claims.

I claim:

1. In an automatic valve assembly of the type wherein a valve is disposed within a valve housing for movement along a prescribed path toward and away from a valve seat in said housing for seating and unseating on said valve seat, the combination therewith of a control member carried by said housing for engaging said valve and for movement in a linear path and also for movement in a pivotal path pivoting about an axis spaced from the path of travel of said valve, said control means being constructed and arranged for seating said valve when said control member is moved to one extreme position along its linear path and to unseat said valve when said control member is moved away from its extreme position along its linear path and to seat said valve when said control member is pivoted to an extreme position in its pivotal path and to unseat said valve when said control member is moved away from its extreme pivoted position, and means for moving said control member in both its linear path and its pivoted path.

2. The structure defined in claim 1 in which said last mentioned means include a pivot pin carried by said housing and a lever pivotally carried by said pivot pin and pivotally connected to said control member, said control member partially encompassing said pivot pin for linear movement by said (lever) control member upon movement of said lever along a prescribed path and for pivotal movement with said lever when said control member engages said pivot pin.

3. The structure defined in claim 2 including a spring for urging said lever to a position to cause said control member to close said valve.

4. The structure defined in claim 1 in which said control member includes a guide arm for riding against a flat surface outside of said housing and a finger connected to said arm and projecting through the discharge spout of said housing for engaging said valve.

5. The structure defined in claim 1 in which said housing includes a lower cylindrical chamber within which the valve is disposed for movement upwardly to seat on said valve seat, said valve being approximately square in cross-section and protruding below said housing, said valve being bifurcated for receiving a flat portion of said control member.

6. In a valve assembly, a housing having a discharge chamber into which liquid is adapted to flow, a valve seat in said chamber, a valve in said chamber below said valve seat and movable toward said valve seat for seating on said valve seat to stop the flow of liquid into said chamber, said valve having a non-circular valve head and a pair of spaced opposed downwardly projecting guide arms in said chamber extending from said valve head, said guide arms defining an outwardly opening slot therebetween, control means carried by said housing for projecting into said slot for moving said valve, said guide arms projecting sufficiently from said chamber that the valve may be urged manually into a seated condition, and means for moving said control means both in an axial path with respect to said housing and in a pivotal path.

7. The structure defined in claim 6 including means on said control means for riding on the exterior of said housing during axial movement of said control means and for pivoting away from said housing during pivotal movement of said control means.

8. The structure defined in claim 7 including a pivot pin carried by said housing, said control means being provided with an inwardly opening notch loosely partially encompassing said pivot pin and means for moving said control means within the confines permitted by said pivot pin in said axial direction and for moving said control means in its pivotal movement when said pivot pin is engaged by said control means.